UNITED STATES PATENT OFFICE.

SIDNEY H. SHORT, OF DENVER, COLORADO, ASSIGNOR TO THE DENVER CEMENT MANUFACTURING COMPANY, OF SAME PLACE.

MANUFACTURE OF HYDRAULIC CEMENT.

SPECIFICATION forming part of Letters Patent No. 305,970, dated September 30, 1884.

Application filed April 21, 1884. (No specimens.)

*To all whom it may concern:*

Be it known that I, SIDNEY H. SHORT, of Denver, in the county of Arapahoe and State of Colorado, have invented a new and useful Improvement in the Manufacture of Hydraulic Cement; and I do hereby declare that the following is a full, clear, and exact description of the same.

My invention relates to an improved hydraulic cement or lime, which may be used to produce artificial stone, either when used alone or mixed with sand, gravel, or broken stone.

The invention consists of a composition or mixture of specified natural materials, and the method of its manufacture, all as hereinafter set forth. First, a limestone is selected which contains about from five to fifteen per cent. of clay and about from two to ten per cent. of magnesia. This is ground to a fine powder in the dry state between millstones. A quantity of this finely-ground limestone is mixed with about an equal weight of a peculiar clay, which is found at the foot of the Rocky Mountains. This clay is the result of the erosion produced by the water washing down the lime hills, together with the washing of the volcanic rocks above these lime ridges, making a very fine clay, without grit or sand, and which, being dry, can easily be mixed with the powdered lime. This clay contains about sixty per cent. of carbonate of lime, about thirty per cent. of clay, most of which is silica in a soluble form, and about ten per cent. of magnesia and alkaline carbonates. When the lime and clay have been mixed thoroughly in a revolving pan with rolls or stirrers on it, water is added to it until it is of the proper consistency to make bricks. It is then made into bricks by a brick-machine, and these are loaded upon cars and put into a drying-oven, where they are dried and heated till very hot. They are then taken from the driers, and while still hot put into an upright-shaft kiln with coke or coal, and heated to about the temperature required to melt cast-iron. The fire is then allowed to go out, and the resulting product taken from the kiln and ground to a fine powder between millstones. This powder when mixed with water sets and becomes as hard or harder than the original limestone, and is of great value for making artificial stone.

I am aware that the elementary substances of which my improved cement is composed have all been heretofore used in various proportions and mixtures with other ingredients to form cement, many of which are set forth in the treatise of J. A. Gillmore, 1872, page 125. I do not, therefore, broadly claim the use of these ingredients, but limit myself to the specific composition of the described limestone and clay.

I claim as my invention—

1. An improved hydraulic cement consisting of a mixture of limestone containing from five to fifteen per cent. of clay, and from three to ten per cent. magnesia mixed with a clay containing about sixty per cent. carbonate of lime, about thirty per cent. of silica, and ten per cent. of magnesia and alkaline carbonates, all substantially as described.

2. The process of treating the hereinbefore-described ingredients to form a hydraulic cement, consisting, first, in mixing thoroughly the lime and clay in a pulverized condition with water, and forming therefrom bricks; next, drying the said bricks, and finally heating them to about the temperature required to melt cast-iron, substantially as described.

In testimony whereof I have signed my name to this specification in the presence of two subscribing witnesses.

SIDNEY H. SHORT.

Witnesses:
    F. J. CHAMBERLIN,
    D. C. PACKARD.